United States Patent
Thompson et al.

(10) Patent No.: US 7,308,247 B2
(45) Date of Patent: Dec. 11, 2007

(54) CELLULAR TELEPHONE SAFETY SYSTEM

(76) Inventors: Demetrius Thompson, 2270 N. Beachwood Dr. #14, Los Angeles, CA (US) 90068; Derek A. Butcher, 3600 Filmore St. #307, San Francisco, CA (US) 94123

( * ) Notice: Subject to any disclaimer, the term of this patent is extended or adjusted under 35 U.S.C. 154(b) by 0 days.

(21) Appl. No.: 11/187,442

(22) Filed: Jul. 20, 2005

(65) Prior Publication Data

US 2006/0040640 A1  Feb. 23, 2006

Related U.S. Application Data

(63) Continuation-in-part of application No. PCT/US2004/010451, filed on Apr. 5, 2004.

(51) Int. Cl.
*H04M 7/00* (2006.01)
*H04Q 7/20* (2006.01)

(52) U.S. Cl. ............... 455/404.2; 455/466; 455/456.1; 701/300

(58) Field of Classification Search ............... 455/420, 455/404.1, 418, 414.1, 419, 409, 446, 404.2, 455/456.1, 456.4, 421, 404, 432, 564, 569.2, 455/565, 457, 410, 411, 401, 533.1, 403, 455/343.3, 348, 553.1, 344

See application file for complete search history.

(56) References Cited

U.S. PATENT DOCUMENTS

| | | | |
|---|---|---|---|
| 5,485,161 A | 1/1996 | Vaughn | |
| 5,828,585 A | 10/1998 | Welk et al. | |
| 6,173,232 B1 | 1/2001 | Nanba et al. | |
| 6,230,100 B1 | 5/2001 | Geier | |
| 6,262,657 B1 | 7/2001 | Okuda et al. | |
| 6,615,134 B2 * | 9/2003 | Ando | 701/209 |
| 6,675,085 B2 | 1/2004 | Straub | |
| 6,720,920 B2 | 4/2004 | Breed et al. | |
| 6,731,925 B2 | 5/2004 | Naboulsi | |
| 6,985,073 B1 * | 1/2006 | Doan | 340/425.5 |
| 2002/0123329 A1 | 9/2002 | Murray | |
| 2003/0073406 A1 * | 4/2003 | Benjamin et al. | 455/41 |

(Continued)

FOREIGN PATENT DOCUMENTS

EP  08212021  7/1996

(Continued)

*Primary Examiner*—Rafael Perez-Gutierrez
*Assistant Examiner*—Amancio Gonzalez
(74) *Attorney, Agent, or Firm*—Berliner & Associates

(57) ABSTRACT

A system for increasing the safety of using cellular telephones stores the geographic coordinates of intersections and other traffic features of a local area in a server. The server is interfaced to the cellular telephone network. A programmable GPS enabled telephone handset determines its location upon start-up and transmits that location to through the cellular network to the server. The server responds by transmitting the coordinates of intersections and traffic features surrounding the present location of the telephone handset. As the handset changes location, it determines its new location and compares it to the coordinates provided by the server. If the telephone handset is within a moving vehicle (as determined by the rate of motion of the handset), an audible alarm is issued when the handset comes within a set distance of one of the intersections or traffic features. In this manner a driver speaking on the telephone is alerted before driving into an intersection or other significant traffic feature.

5 Claims, 1 Drawing Sheet

U.S. PATENT DOCUMENTS

2004/0121783 A1* 6/2004 Chua et al. .............. 455/456.1
2005/0288046 A1* 12/2005 Zhao et al. .................. 455/466

FOREIGN PATENT DOCUMENTS

| | | |
|---|---|---|
| EP | 0789498 | 7/1997 |
| JP | 410276126 A | 10/1998 |
| WO | WO 96/01531 | 1/1996 |
| WO | WO 96/35197 | 11/1996 |
| WO | WO 98/16077 | 4/1998 |
| WO | WO 98/25158 | 6/1998 |
| WO | WO 98/59256 | 12/1998 |

* cited by examiner

CELLULAR TELEPHONE SAFETY SYSTEM

CROSS-REFERENCE TO RELATED APPLICATIONS

The present application is a continuation-in-part application of (PCT/US2004/010451 (filed 5 Apr. 2004) designating the United States; that entire application is incorporated herein by reference.

REFERENCE TO COMPUTER PROGRAM LISTING APPENDIX ON COMPACT DISK

The computer program listings that are concurrently submitted on compact disk are hereby incorporated by reference. The compact disc contains two files: 1) mymobilealert.txt a file created on Mar. 2, 2005 containing 35,254 bytes; and 2) Server_source_code.txt a file created on Jul. 13, 2005 containing 6,032 bytes.

BACKGROUND OF THE INVENTION

1. Area of the Art

The present invention is in the field of cellular telephonic communication and more specifically to a system for ensuring safe use of cellular telephones while driving.

2. Description of the Background of the Invention

Within the last fifteen years, the cellular telephone (cell phone) has evolved from a bulky, expensive device that was rarely seen to an inexpensive, tiny device of ubiquitous presence. One has only to walk through a shopping mall to see that virtually every person from sub-teenagers to octogenarians is talking on a cell phone. In a mall this causes minor inconveniences as the telephone users pay more attention to their conversations than to their walking and collide with each other or with stationary objects. Unfortunately, the same pattern is repeated in automobiles. Almost every car has a cell phone, and conversing drivers often lose track of their driving as they communicate. Although there was some thought that the lack of "hands-free" telephones exacerbated the problem, this supposition has proven untrue. The most up to date studies have shown that use of cellular telephones while driving increases the frequency and severity of accidents to about the same degree whether or not a hands-free phone is used. Thus, the dangers of one handed driving and of looking at the phone buttons rather than the road are secondary to the serious inattention caused by talking on the phone while driving. Many states and municipalities are attempting to deal with this problem by passing laws against "driving while phoning" but these laws are, at best, difficult to enforce.

The cellular telephone system is a technological wonder, and a number of driving-related enhancements to that system have been proposed. WO 96/01531 uses the cellular telephone system to determine the location and speed of a vehicle carrying an active cellular telephone. It is proposed that this system be used for an automatic parking system (to record the presence of a vehicle in a parking slot & charge for that parking, etc.), as a speed radar system that could automatically charge speeding violations to a user's telephone bill or as a theft deterrent to locate stolen vehicles. WO 98/16077, WO 98/25158 and WO 98/59256 disclose the use of a GPS (Global Positioning System) receiver in conjunction with the cellular network to derive similar information. Unfortunately, pure GPS systems have inadequate response times for most safety uses.

Japanese laid-open patent application H10-42371 deals with another aspect of the driving while phoning problem. That application discloses a vehicle mounted unit that jams any cellular signals while the car is in operation. Of course, this makes the reception of important calls impossible. U.S. Pat. No. 6,262,657 to Okuda et al. obviates some of these problems by automatically issuing a driver alert (received over the telephone) when driving characteristics become erratic while a cellular phone is being used. However, both of these solutions require a separate unit mounted in the vehicle. Thus, a user is not protected in rental cars or cars other than his or her usual vehicle.

An independent development in the arena of driving safety is the camera equipped road intersection. The traffic light or signal is mainstay of urban and suburban traffic control. Intersections in most well-traveled areas are controlled by traffic signals. These devices are largely responsible for bringing some semblance of order to traffic flow by periodically stopping the traffic on one route to allow traffic on an intersecting or crossing route to traverse an intersection. The change of signals from yellow and then to red should ensure orderly and safe traffic flow. Unfortunately, there are at least two problems: lack of driver attention (often exacerbated by cell phone use) and drivers attempting to beat the system. Lack of attention can arise from numerous causes including use of a cellular telephone. The urge to "beat the system" is to some extent a byproduct of the signal system itself. The change from green to yellow is made to allow prudent drivers to stop safely before they enter the intersection. Because the signal in the crossing direction remains red during the yellow portion of the cycle, cars caught in the intersection have a chance to safely exit before cross traffic begins to flow. The problem is that drivers soon learn that it is "legal" (but not necessarily safe or prudent) to enter the intersection after the light turns yellow. Therefore, drivers often accelerate (instead of stopping) when they see a yellow light. This results in cars being in the intersection after the light turns red. It also results in collisions as drivers in the crossing direction enter the intersection in response to a green light. In some intersections, a delay is added so that the crossing light does not become green until sometime after the yellow to red transition. This would seem to be a way to guarantee safety, but it often has the opposite effect. This is because yellow light runners intent on beating the system learn to trust the delay and are even more apt to enter the intersection against a yellow signal. There are also a small number of scofflaws who simply ignore the red signal and stop at nothing (short of a collision).

This problem has been addressed by a growing number of intersections equipped with an automatic camera system that snaps a picture of any car entering the intersection after the signal turns yellow. The photographs are then used to legally fine the offenders with an automatic "photographic citation". On paper, the system is relatively simple. A sensor in the pavement at the stop line detects the crossing of each automobile. This sensor is linked electronically to the traffic signal timing device. If the signal is red when a car passes over the sensor, this initiates a photography sequence that snaps a picture of the car after a slight delay so that the car is centered in the intersection. There has been considerable controversy over these systems because there is a possibility that the photographed car may not be the same car that tripped the sensor. In addition, the driver has no independent way of proving the status of the light when the vehicle crossed the stop line.

SUMMARY OF THE INVENTION

It is an object of the present invention to provide enhanced safety for vehicle drivers using a cellular telephone without requiring special vehicle mounted hardware;

It is an additional object of the present invention to enhance safety of a cellular phone equipped car, crossing an intersection controlled by traffic lights.

The inventive software system encourages the safe use of cellular telephones when operating a moving vehicle near a controlled-intersection area by sending an alert sound to the operator of a cellular phone in a moving vehicle approaching a traffic signal at an intersection.

From the standpoint of the cellular telephone user, the current invention is a "software only" solution. As will be detailed below, the system can be improved by special hardware outside of the cellular telephone system. The client software can be installed on any GPS-enabled phone via a download from the cellular service provider. Currently the U.S. Federal Communication Commission (FCC) E911 order Phase II requires that cellular telephone providers begin to offer systems that will provide precise location information for 911 emergency cell phone calls. Several different systems to comply with this FCC rule are under development, and many of these utilize Global Positioning Satellites (GPS). The current invention takes advantage of Assisted GPS (A-GPS) in which network software and other features allow rapid GPS determinations to be made by GPS enabled hand sets (cellular telephones). It is highly likely that any system adopted to comply with the FCC rule will include some thing related to A-GPS. Therefore, the current invention can be easily updated to utilize such a system. The present invention allows a GPS enabled handset equipped with the inventive software to receive alerts based on proximity to intersections. Intersection coordinates in the geographical area of the handset are automatically and periodically received by the handset from a special server. For wide applicability the server software is based on Linux, and is installed and hosted by the service provider.

An important feature of the invention is that no user interaction with the software is required. The software runs in the background on the phone, and alerts the user when the user's vehicle approaches an intersection controlled by a traffic signal. In its simplest embodiment the system tracks the positional relationships between the user and the intersection. All too often drivers talking on a cell phones will briefly lose touch with their environment as they concentrate on the phone call. Such a momentary lapse can be disastrous if the driver enters an intersection against the lights. Unlike the camera equipped intersection used to punish drivers after they have committed a driving violation, such as driving through a red light at an intersection, the present invention warns drivers to be attentive and cautious as they approach traffic signals. Thus the invention can prevent possible tragedy. In an enhanced embodiment the invention provides an additional warning if the light in the intersection is red (that is, the light prohibits the driver's entry into the intersection). This feature is provided by a communication link between the server and either the individual traffic signal or the Traffic Control System (TCS) for a city or region.

The invention issues an audible alert (such as a unique warning sound) when the cellular telephone approaches an intersection. If the light at the intersection is red (or calculated to be red by the time the vehicle reaches the intersection), a different audible alert can be issued. The trigger distance from the intersection is selected to provide the cellular telephone user a sufficient time to make a response to the alert. In the simplest case the alert is always issued at a fixed distance from the intersection. In a more complex embodiment the system estimates the speed of the moving cell phone and issues the alert earlier (farther from the intersection), the faster the phone and vehicle carrying it are moving towards the intersection.

DETAILED DESCRIPTION OF THE INVENTION

Figure 1:
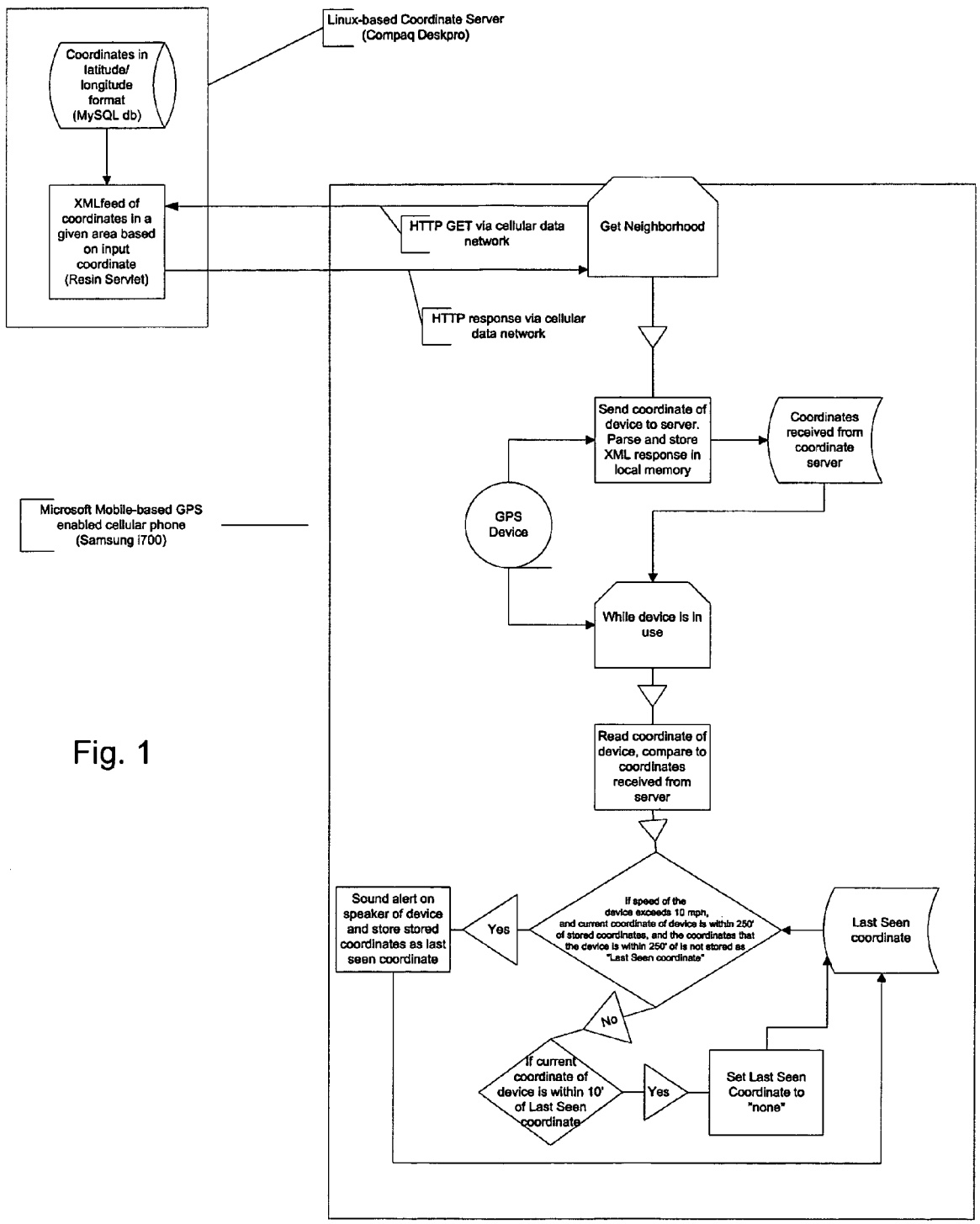
FIG. 1 is a logical flow chart showing how the server and hand set programs of the present invention interact.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a warning system to warn when a cellular telephone is about to enter into an intersection The following details are provided concerning a demonstration that was performed by the inventor to prove that his invention was operational. It will be appreciated that systems and software used for this demonstration may vary from those used in an actual commercial implementation.

The scope of the prototype software was constrained for development purposes to be implemented on a Microsoft Mobile-based GPS-enabled cellular device. A copy of the prototype software is contained in the computer software appendix on compact disk as "mymobilealert.txt." A Microsoft Mobile-based GPS-enabled device platform was chosen for multiple reasons:

1) Microsoft is currently beta-testing an advanced, provider-independent location system that leverages A-GPS, a standard feature on most new cellular phones; this will provide a strong growth potential for the prototype's chosen software platform;

2) Microsoft currently provides the number two Smartphone operating system (Microsoft Mobile) worldwide, behind only Nokia's Symbion operating system, which has its main presence in the European GSM market, thereby virtually ensuring that the software will work with widely available hand sets;

3) Microsoft plans to ship 100 million Smartphones and wireless PDA's in the year 2007-thus it is likely that the prototype software will be directly usable.

4) Smartphones running Microsoft Mobile typically have SDIO (smart device input/output) slots and support Bluetooth, allowing for a wide range of GPS devices to be utilized for demonstration purposes (as opposed to being limited to a hand set with an integral GPS system);

5) GPS is the most accurate and widespread global positioning system, accurate in most cases to 3 meters or less; and 6) A-GPS, a modification of GPS, is widely deployed in current cellular phones in order to comply with the U.S. E-911 system requirements; in the future all or almost all U.S. cellular providers or equipment manufacturers will support location-based services via A-GPS (or similar method).

The server software was implemented on an Intel-based Linux machine running Apache, Resin, and MySQL. A copy of the prototype server software is contained in the computer software appendix on compact disk as "server_source_code.txt." This server platform was chosen for the following reasons:

1) The server software platform is open-source and available for little to no cost;

2) The server software platform is a high performance solution, used by many enterprises worldwide;

3) The server software platform is widely used by software developers worldwide, ensuring easy maintenance and expandability by future developer personnel; and 4) The server hardware platform is widely used, and the cost to performance ratio is very favorable compared to other hardware solutions.

Latitude and Longitude coordinates for signal light-controlled intersections or other traffic features in a given overall area are stored in a MySQL database table on the server. The coordinates are sorted and indexed by relative proximity. Note that coordinates available in the State Plane system must be translated into Latitude and Longitude in order to be compatible with the latitude and longitude coordinates that are reported by a GPS system. For demonstration purposes, the coordinates of a large number of traffic intersections were obtained from the transportation department of a major U.S. city.

A Resin® process (a high-performance application server process) on the server accepts incoming HTTP GET requests specifying a given coordinate in the overall area, and returns, via XML over HTTP, a subset of signal-controlled intersection coordinates in that area within a certain area radius of the input coordinate. The subset is meant to be defined by the memory constraints of the device. Upon startup, and periodically when idle, the device software runs a process using TCP/IP to send its current coordinate to the server, storing the returned signal-controlled intersection (or other traffic feature) coordinates from the server in the device's local memory. In other words, the device reports its position and receives back from the server the coordinates of intersections within a certain radius of the device (the "neighborhood"). These coordinates are stored in memory, and this set of coordinates is periodically updated as the device changes its position.

When the device is in use, the device's current coordinates are continually read from the GPS unit that is contained in, attached to, or otherwise linked with the device. This process is rapid because it utilizes standard device communication protocols (including network assistance). Each current coordinate read by the device is compared to the local set of coordinates contained on the device. If the change in coordinates read by the device indicates that the speed of the device exceeds 10 mph, that the current coordinate of the device is within 250 feet (very roughly one half to one quarter of a city block) of one of the local set of coordinates (the "alarm coordinate") contained on the device, that the change in coordinates indicates that the device is moving towards one of the local set of coordinates stored on the device, and that the alarm coordinate of the device is not stored as the "last seen coordinate", the device sounds an alert on the speaker of the device, and stores the alarm coordinate as the "last seen coordinate". When the device is within 10' of the stored "last seen coordinate" (proximity rule) the device sets the "last seen coordinate" to "none". Of course, it is also possible to issue a visible alarm such as a bright flashing light instead of or in addition to the audible alarm.

This logic flow (see FIG. 1) which is implemented in the hand set software provides several advantages:

1) The device is independent from the server for most operations, only needing to contact the server when the device moves outside the area defined by the local set of coordinates stored on the device. This is important because it reduces cellular network data activity by the device, and ensures that a voice phone call will not generally interfere with the device's ability to load coordinate data;

2) The comparison of the coordinate data is much faster, because the device is storing the comparison data locally;

3) The device will generally only sound an alert for cellular phones that are in moving vehicles, due to the 10 mph constraint (this can be changed or readily adjusted dynamically to take care of traffic slow downs, etc.); and 4) The device will only sound an alert for a given coordinate set once. By storing the set as the "last seen coordinate", the device will reset its memory of that coordinate when passing through the coordinate (defined by the 10' proximity rule) and will not sound an alert when moving away from a coordinate (this prevents a warning from issuing after the vehicle passes the intersection).

The demonstration software was developed under Microsoft's .Net Compact Framework, using Visual C#. Most functions are using the managed code of the Compact Framework, although certain telephony and sound functions were only available in the Windows un-managed code libraries, and a P-Invoke on the appropriate DLL was used in these cases. The device software also uses a licensed copy of the GPS.Net GPS device classes.

The demonstration device hardware was a Samsung i700. This unit was chosen because it is a Microsoft Mobile based cellular phone, and it has a SDIO slot that employs Bsquare's SDNow device driver system. This accommodates the widest array of GPS solutions, including Bluetooth solutions via an SD Bluetooth card. The device must be set up a data plan from the cellular service provider to ensure that the device is able to download the coordinates from the server to the device.

The GPS unit chosen for the demonstration was the Pharos iGPS-SD card. The server software employed only standard Java classes and is implemented on Resin® using the standard http-servlet class. The server hardware was a Compaq Deskpro en, with a 700 mhz PIII processor, 368 MB of RAM, and a 10 GB hard disk.

Operation of the System

In the simplified embodiment described herein there are two basic components: the device which represents the GPS enabled cellular telephone hand set; and the server which is the repository of the intersection (or other traffic feature coordinates) and is in communication with the cellular telephone transmission system.

To start the server system for the demonstration, the user first boots the Linux machine, and logs in. The Apache, MySQL, and Resin processes are set up to start automatically via the appropriate "/etc/init.d*" files. In commercial practice the server system would be operated by the cellular provider and would always be available. Coordinates are then loaded into the server's database by a MySQL loader program that accepts data from a CSV or other similar coordinate file. As previously explained, the coordinates are the physical locations of the intersections or other locations that the device will track and respond to.

When the actual device is activated the program causes the device to perform the following functions. First, the device determines the coordinates of it current position using A-GPS or a standard attached or integrated GPS system. Briefly, an A-GPS (or similar) system uses network-based methods to greatly simplify GPS location detection. For example, Short Messaging Service (SMS) or a similar data transmission method is used to provide approximate position and the decoded satellite ephemeris and clock information to the GPS subsystem that forms part of the device. This allows the device to rapidly determine its position in spite of the weak signals and inability to obtain fixes on all of the GPS satellites that often plague GPS determination in a city. Once a location determination has been made, this coordinate is stored as the "center coordinate" and the device requests the "neighborhood" of intersection coordinates by supplying the center coordinate a certain radius. This radius-defined neighborhood is determined according to the amount of memory available in the device. Once this neighborhood of coordinates is available, the device continues to determine its present location and compares that location to the coordinate points in the neighborhood. When the device determines that is located within a set distance (here 250 feet) of one of the coordinates, an alarm is issued. In the demonstration implementation, the neighborhood is refreshed and a new center coordinate is stored when the device moves a distance from the current center coordinate equal to 90% of the distance of the radius of the "neighborhood." Various other criteria can be used to alter or force the refresh. For example, if the device reaches one of the coordinates near an edge of the neighborhood, a new neighborhood is immediately requested.

The system is also intended to interact with the TCS in larger cities and towns. The simplest way for this interaction to occur is for the device to inform the server when it is approaching one of the intersections. This message would be sent shortly before the alarm to the user is issued. The server then queries the TCS to determine the current state of the traffic light (in the direction from which the device is approaching the intersection). If the light is red or about to go red, the device can then issue an additional special warning alert to the user. By providing an additional alarm concerning the existence of a red light, the user is even less likely to ignore the warning. The precise implementation of the communication with the TCS can vary depending on the number of intersections involved. If the number of intersections is relatively small, it is sufficiently efficient to issue actual inquiries concerning a given intersection. For small municipalities that do not have a master TCS, it is possible to provide individual transponders for each intersection to provide intersection status information to the server. With a large TCS it may not be practical for the server to constantly query the TCS. Instead the server software can maintain a logical representation of the TCS based on the expected frequency of signal changes at each intersection. The actual frequency of the various intersections and correct synchronization can be determined and maintained by periodically querying the TCS concerning the state of each intersection. This can be done automatically following a predetermined order of intersections so that each intersection is queried with a reasonable periodicity. The timing system used by commercial TCSs is extremely accurate so that once the "model" is established, it will be highly accurate. Alternatively, creating the software representation can be simplified by obtaining the actual intersection interval and offset phase information from the city Traffic Department.

Additionally, it is possible to allow the server to either "push" the neighborhood to the device or to give the server the ability to issue a request that would force the device to request a refresh of the neighborhood. Particularly in a large city this can be very important from a safety standpoint. Any time there is a serious accident or other problem (signals out, close streets, etc.) the city authorities might wish to warn traffic away from an effected area. The city could put the effected intersections on a special list and request that the server force an update. Any devices having the effected intersections in their neighborhood would receive an update indicating that there was a problem at certain locations. The device could then warn the driver away from those locations. Alternatively, since the server would "know" which devices were potentially in the vicinity of the effected sites, it would also be possible to send an automated warning telephone message to those devices. The form of response could be selected on the basis of the seriousness of the problem.

An alternate embodiment of the invention is to offload part or all of the positional comparison to the server. Under that scenario the server would be constantly updated on the position of the hand set and would send the instructions to issue an alarm to the handset when the hand set was sufficiently close to one of the feature coordinates. The server could also interface with the TCS so that the alarm could also include information about the status of the light at the intersection. A drawback to this approach is that it would increase the amount of data traffic on the cellular network since each head set would be constantly sending positional information.

Applicable Standards Documents.

Microsoft .Net Managed Code (Common Language Infrastructure) API;

NMEA 0183 GPS standard;

Bsquare SDIO SDNow! Secure Digital standard;

Sun Java J2SE standard;

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

We claim:

1. A method for improving safety in using a wireless communication device in a moving vehicle, the wireless communication device having an active voice mode wherein a person can speak through the wireless communication device, and is capable of receiving a GPS signal that includes GPS coordinates of a plurality of traffic lights, comprising exercising the following steps by means of a computer program operating within the vehicle:

(a) querying the GPS to obtain a current location for the wireless communication device in the form of geographical coordinates;

(b) periodically updating the current location to create the then current location;

(c) comparing the geographical coordinates of the then current location to the geographical coordinates of the closest of said traffic lights;

(d) determining when if the then current location is within a predetermined distance from said closest of said traffic lights;

(e) determining if the vehicle is moving;

(f) determining if the wireless communication device is in an active voice mode; and (g) issuing an audible alarm in response to determining that (i) the then current location is within the predetermined distance, (ii) the vehicle is moving, and (ii) the wireless communication device is in an active voice mode, whereby a user of the wireless communication device is warned of proximity to said closest traffic light.

2. The method of claim 1, wherein the traffic lights include those that are at intersections.

3. The method of claim 2 including the step of determining if the closest of said traffic lights is a red light or is calculated to be red by the time the vehicle reaches the intersection.

4. The method of claim 1 wherein the wireless communication device is a cellular telephone.

5. The method of claim 4 wherein the computer program operates within the cellular telephone.

* * * * *